April 9, 1963 V. R. WITT 3,085,236

TAPE RECORDING SYSTEM

Filed Dec. 17, 1957 5 Sheets-Sheet 1

INVENTOR.
VICTOR R. WITT

BY

Brumbaugh, Free, Graves & Donohue his ATTORNEYS.

April 9, 1963 V. R. WITT 3,085,236

TAPE RECORDING SYSTEM

Filed Dec. 17, 1957 5 Sheets-Sheet 2

INVENTOR.
VICTOR R. WITT

BY Brumbaugh, Free, Graves & Donohue his ATTORNEYS.

April 9, 1963 V. R. WITT 3,085,236

TAPE RECORDING SYSTEM

Filed Dec. 17, 1957 5 Sheets-Sheet 3

RECORD OPERATION

INVENTOR.
VICTOR R. WITT
BY
Brumbaugh, Free, Graves & Donohue
his ATTORNEYS.

April 9, 1963 V. R. WITT 3,085,236

TAPE RECORDING SYSTEM

Filed Dec. 17, 1957 5 Sheets-Sheet 4

| Tape Signal Read | Pulse Rec'd | Core Positions 33 | 34 | 35 | 36 | 37 | 38 | 39 | Read out Trigger 47 |
|---|---|---|---|---|---|---|---|---|---|
| START SIGNAL → | 1 | 1 | 0 | 0 | 0 | 0 | 0 | 0 | 0 |
| 1R | 1 | 0 | 1 | 0 | 0 | 0 | 0 | 0 | 0 |
| "C" | 1 | 1 | 1 | 0 | 0 | 0 | 0 | 0 | 0 |
| 2R | 1 | 0 | 1 | 1 | 0 | 0 | 0 | 0 | 0 |
| "I" | 1 | 1 | 1 | 1 | 0 | 0 | 0 | 0 | 0 |
| 3R | 1 | 0 | 1 | 1 | 1 | 0 | 0 | 0 | 0 |
| "2" | 0 | 0 | 1 | 1 | 1 | 0 | 0 | 0 | 0 |
| 4R | 1 | 0 | 0 | 1 | 1 | 1 | 0 | 0 | 0 |
| "4" | 0 | 0 | 0 | 1 | 1 | 1 | 0 | 0 | 0 |
| 5R | 1 | 0 | 0 | 0 | 1 | 1 | 1 | 0 | 0 |
| "8" | 0 | 0 | 0 | 0 | 1 | 1 | 1 | 0 | 0 |
| 6R | 1 | 0 | 0 | 0 | 0 | 1 | 1 | 1 | 0 |
| "A" | 1 | 1 | 0 | 0 | 0 | 1 | 1 | 1 | 0 |
| 7R | 1 | 0 | 1 | 0 | 0 | 0 | 1 | 1 | 1 |
| "B" | 1 | 1 | 1 | 0 | 0 | 0 | 1 | 1 | 1 |
| 8R | 1 | 0 | 1 | 1 | 0 | 0 | 0 | 1 | 1 |

INVENTOR.
VICTOR R. WITT

BY
Brumbaugh, Free, Graves & Donohue
his ATTORNEYS.

INVENTOR.
VICTOR R. WITT
BY
Brumbaugh, Free, Graves & Donohue
his ATTORNEYS.

United States Patent Office 3,085,236

Patented Apr. 9, 1963

3,085,236

TAPE RECORDING SYSTEM

Victor R. Witt, Poughkeepsie, N.Y., assignor to International Business Machines Corporation, New York, N.Y., a corporation of New York Filed Dec. 17, 1957, Ser. No. 703,398

5 Claims. (Cl. 340—347)

This invention relates to tape recording systems and, more particularly, to a tape system arranged to receive coded information signals in parallel form, record them in serial form, and reproduce them in parallel form.

In the automatic control of certain types of equipment, such for example as, elastic typewriters, coded operating information is best supplied thereto in parallel form, that is, the information signals comprising each code directing a particular operation are presented simultaneously in separate channels from a code record. Many types of recording equipment, however, such as magnetic tape recorders for example, are capable of reading and recording information more rapidly than such automatic equipment can respond to it, therefore requiring the recorder to be started and stopped to record or reproduce the coded information corresponding to each operation. Accordingly, the most efficient utilization of the recording medium is obtained when the information signals representing each operation are recorded thereon in serial form, that is, by sequential presentation of the information signals for recording on a single track or channel.

Therefore, it is an object of this invention to provide new and improved apparatus for translating code information from parallel form to serial form and from serial form to parallel form.

Another object of the invention is to provide recording equipment capable of receiving parallel information signals and recording them in serial form.

A further object of the invention is to provide equipment of the above character adapted to reproduce serially recorded information in parallel form.

Still another object of the invention is to provide a recording system capable of recording information entered into a electric typewriter and reproducing the same information to operate the typewriter automatically.

These and other objects of the invention are accomplished by linking a group of storage units in series so that an information signal stored in one unit is transferred to the next unit when the first unit is reset. Thus, an information signal, or bit, which may be either a "one" or a "zero," for example, is transferred in step fashion from the first unit to the last in the series by a timed sequence of resetting pulses. At the same time, a sequence of output signals is generated by the series of storage units and binary output signals are transmitted to a recorder in serial form according to the composition of the parallel code, a reference signal being inserted between each pair of adjacent information positions and before and after the code group.

In order reproduce serially recorded information in parallel form, a gate is utilized to apply the information signals in sequence to the first storage unit and block the reference signals therefrom. Another gate is arranged to present the reference signals to the series of storage units as resetting pulses while blocking the information signals. Inasmuch as the reference signals are positioned between the information signals in the series, each information signal is transferred from one storage unit to the next in step fashion until the entire group of code signals has been registered in the array. A final resetting signal generates simultaneous output pulses from selected storage units according to the composition of the serial code, thus translating the information back into parallel form.

Further objects and advantages of the invention will be apparent from a reading of the following description in conjunction with the accompanying drawings in which.

Figure 1:
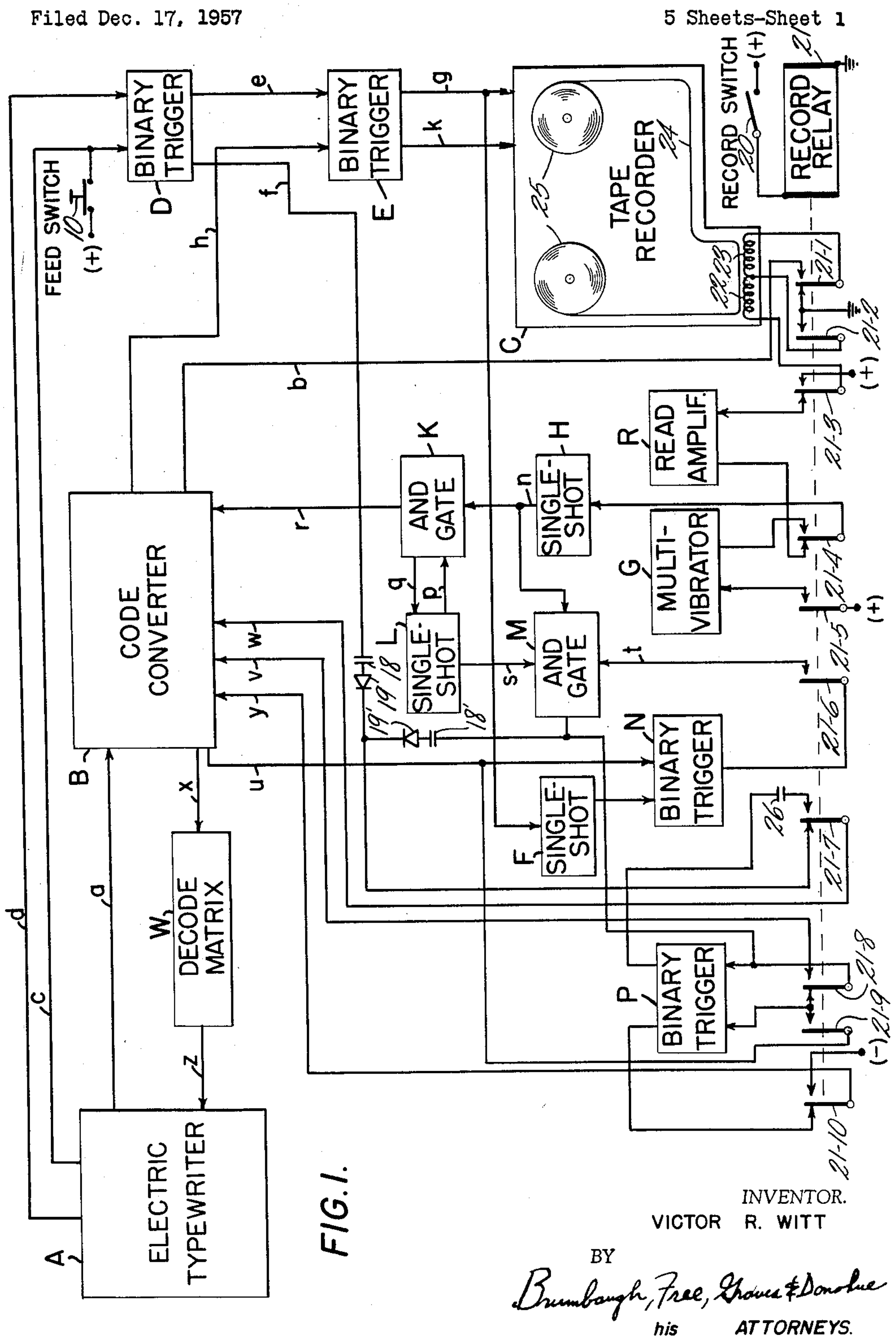
FIG. 1 is a block diagram illustrating schematically the circuit of a typical tape recording system arranged according to the invention.

In a typical recording system arranged according to the invention as illustrated in FIG. 1, a conventional electric typewriter is adapted to generate a group of parallel code signals in response to each manipulation such, for example, as a specific character key depression or a carriage return. Each code comprises a group of parallel information signals or bits in binary form each bit being either a "one" or a "zero," and may be produced in any well-known manner, such as by selective closing of internal contacts associated with the manipulated mechanical element of the typewriter. In addition, each operative element in the typewriter is arranged in the customary way to respond to actuating signals applied thereto in accordance with the same code so that the same information is reproduced by playback of the same code signals. After each operation, the typewriter is automatically locked to prevent further operation until the code has been recorded, for example by simultaneous energization of an internal locking magnet and a slow-operating restoring magnet with each operation.

Although any of a number of well-known code signal configurations may be utilized with the present tape recording system, the following description will be made with reference to a seven channel code wherein operating information is carried by six of the channels and check signal is sent through the seventh channel to assure correct processing and reproduction of the operating information. In this code, frequently referred to as a "BA8421C" code, the seventh channel carries a "one" if the number of "ones" in the first six channels for a particular code is odd, and a "zero" if there are an even number of "ones," thus making the total number of "ones" transmitted even in every case.

Figure 2:
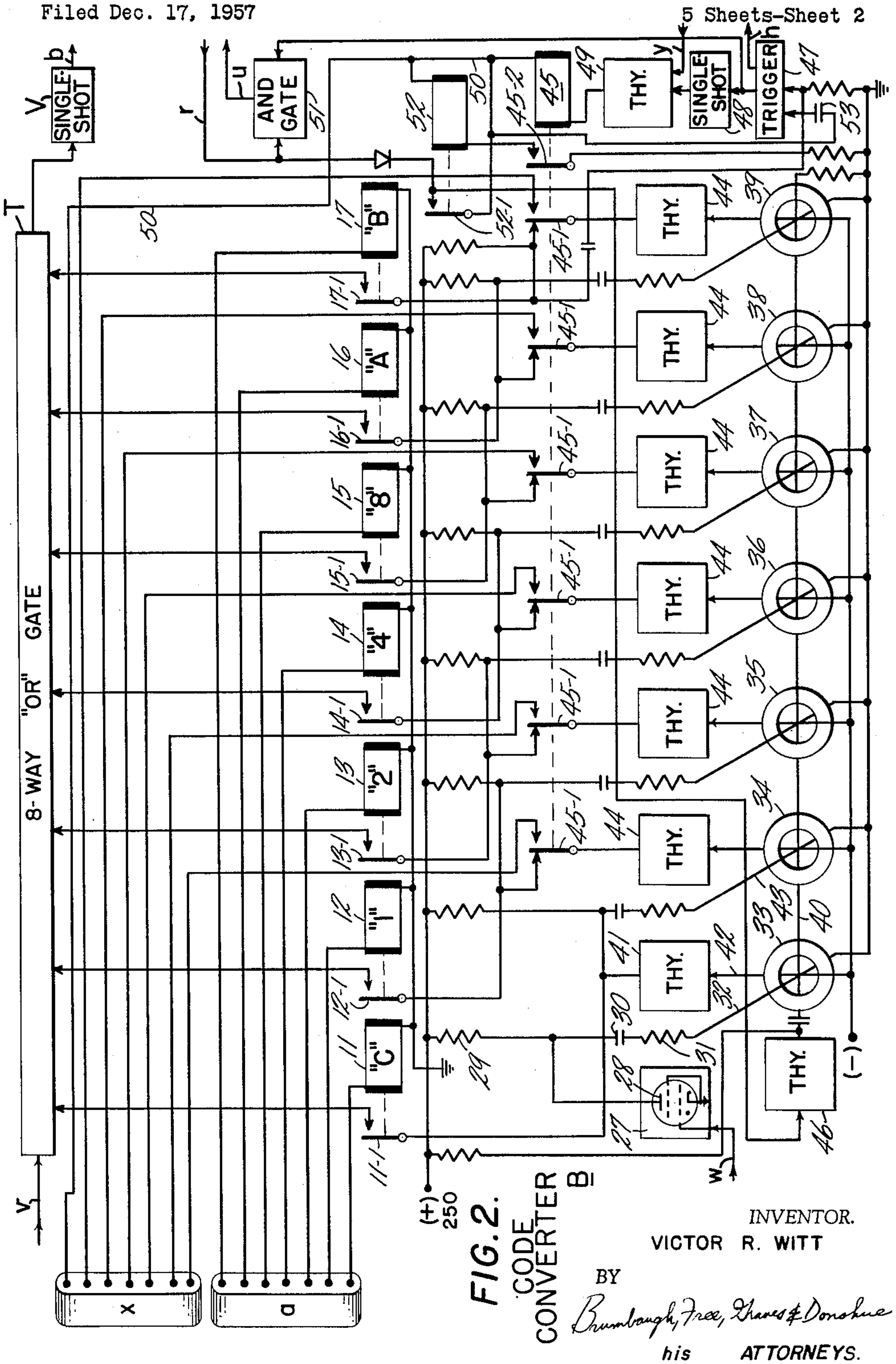
FIG. 2 is a schematic circuit diagram illustrating a code converter arranged according to the invention.

Each operation code generated by the typewriter A is carried to a code converter B through a cable *a* energizing selected relays in the groups 11, 12, 13, 14, 15, 16 and 17, shown in FIG. 2, according to the specific signal arrangement of the code. In the arrangement described herein positive voltage signals from the typewriter are transmitted to represent "ones" while zero voltage represents "zeros." Accordingly, typing of the character "A," which is represented in the "BA8421C" code by "ones" in the "B," "A" and "1" channels, energizes the relays 12, 16, and 17, along with the "C" channel relay 11, the first six channels having an odd number of "ones." These relays remain energized in this manner storing the code signals until the same information has been transmitted through a line *b* in serial form to a tape recorder C as described below, after which the internal typewriter contacts are released.

At the same time, in response to each operation the typewriter transmits an actuating signal, such as a positive voltage pulse, to a conventional binary trigger D by way of a conductor *c*, shifting the trigger from the "on" to the "off" condition, the trigger being returned to its original "on" state by completion of the typewriter operation which sends a pulse through a connecting line *d*. In addition, this trigger may be turned off by momentary closing of a feed switch 10 connecting the conductor *c* to a positive voltage source. Transfer of this trigger to the "off" condition sends a signal through a conductor *e* to a second trigger E turning it on, a positive voltage pulse being sent, in addition, to a capacitor 18 and a diode 19 by another output conductor *f* at the same time. Inasmuch as the design of various binary or flip-flop triggers is well-known in the art and any conventional trigger capable of performing the desired functions is suitable for use in the system, these elements are not set forth in detail herein for simplicity of description.

In order to adapt the tape recording system described herein for recording information entered in the typewriter A, a record switch 20 is closed to energize a record relay 21 transferring three contacts 21–1, 21–2, and 21–3. As a result, two transducer windings 22 and 23 in the magnetic head of the tape recorder C are connected to record on a tape 24 serial information received in the line *b* from the code converter B. The tape 24 may be conventional single-track tape one-quarter inch wide, for example. Within the recorder C suitable drive means (not shown) of the usual type are arranged to transport the tape from one of two reels 25 to the other and past the magnetic transducers 22 and 23. When the trigger E is turned on, energizing a line *g* to the recorder, the tape drive means therein is started, moving the tape past the transducer at the desired speed, a single-shot pulse generator F being actuated from the same line to delay recording of signals until the tape is up to recording speed. Receipt of a signal through a line *h* from the code converter at the end of each operation turns off the trigger E, causing the drive means to be stopped by a signal transmitted through a conductor *k*.

With the record relay 21 actuated, a positive voltage source actuates a multivibrator G through the contact 21–5 to produce a sequence of pulses providing a time base for the serial recording of the information signals stored in the code converter. Each output pulse from the multivibrator fires a single-shot pulse generator H through the normally open contact 21–4, now closed. These circuit elements may comprise any suitable well-known arrangements and in the present embodiment the multivibrator output consists of a series of 300 microsecond pulses having a maximum potential of 150 volts separated by intervals of 300 microseconds during which an 80 volt potential is maintained, as illustrated graphically by the wave form (*a*) of FIG. 3. In response to each multivibrator pulse, the single-shot H generates a similar pulse having approximately 60 microseconds' duration.

Figure 6:
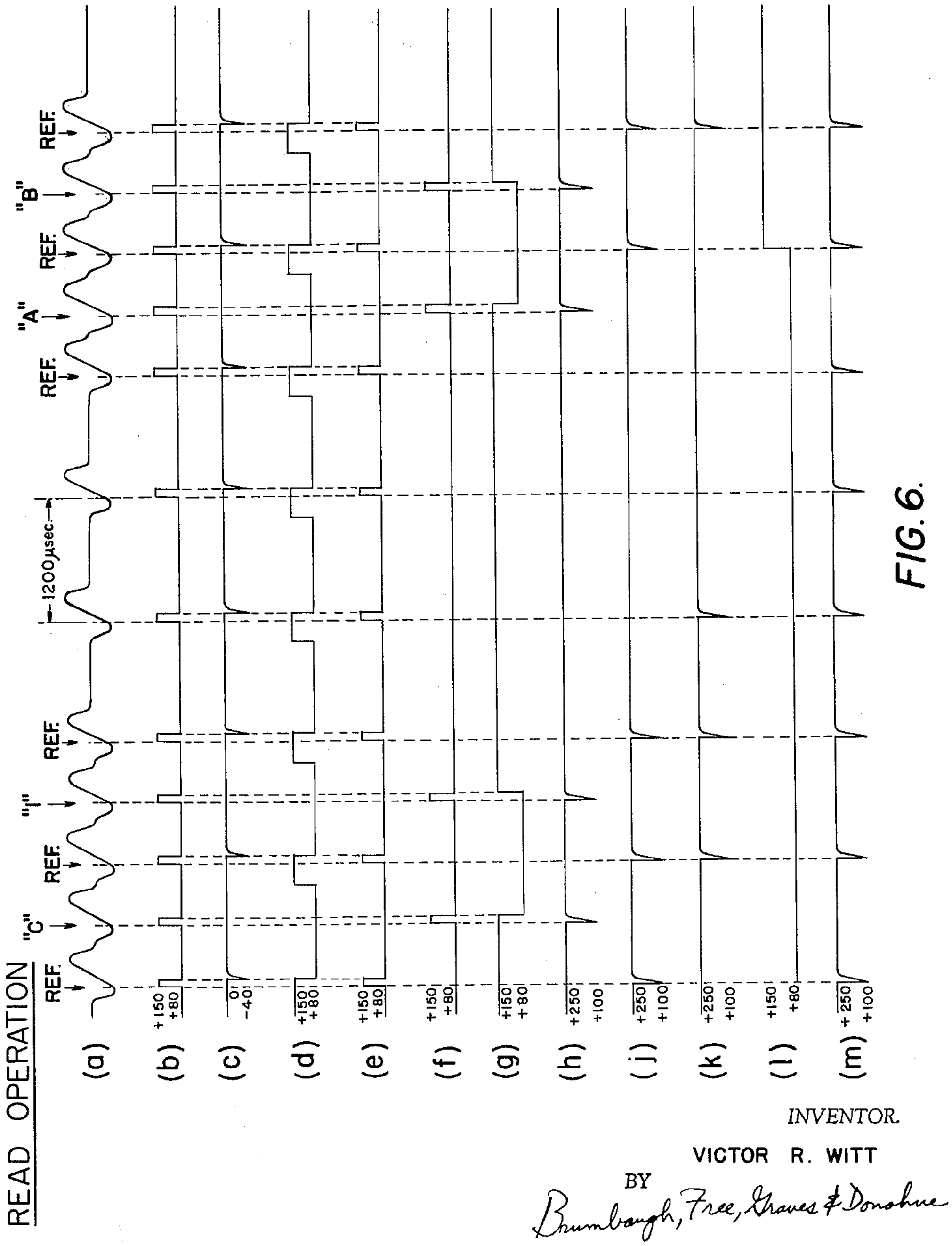
FIG. 6 is a graphical representation of the wave forms occurring at various points in the system when a recorded message is being reproduced.

If the record relay 21 is deenergized, the normally closed contacts 21–1, 21–2 and 21–3 link the transducer windings 22 and 23 to reproduce information pulses recorded on the tape 24 and apply them in sequence to a conventional read amplifier R. Amplified signals therefrom, which are represented graphically by the wave form (*a*) of FIG. 6, pass through the normally closed contact 21–4 to actuate the single-shot generator H in the same manner, each output signal therefrom being initiated by the first increase in input signal level as seen in FIG. 6(*b*).

Signals generated by the single-shot H raise its output conductor *n* from 80 to 150 volts positive, and one input to an AND gate K which is of the usual type, in this case arranged to respond only to coincident 150 volt signals, is connected to the *n* conductor, while the other input signal thereto is received from another single-shot generator L through a line *p*. Inasmuch as the termination of each signal transmitted by the gate K causes a negative pulse to be sent through a line *q* to actuate the generator L and each resulting pulse from the generator is applied to the line *p* to reduce its potential from 150 volts to 80 volts for approximately 900 microseconds, it will be apparent that only signals separated by at least 900 microseconds will be passed by the gate K and sent to the code converter B through its output conductor *r*. This is illustrated in FIG. 3 wherein the wave forms (*c*), (*d*) and (*e*) represent signals transmitted by the lines *q*, *p* and *r*, respectively, the *r* conductor signals being utilized to transfer information within the code converter as described hereinafter.

Figure 3:
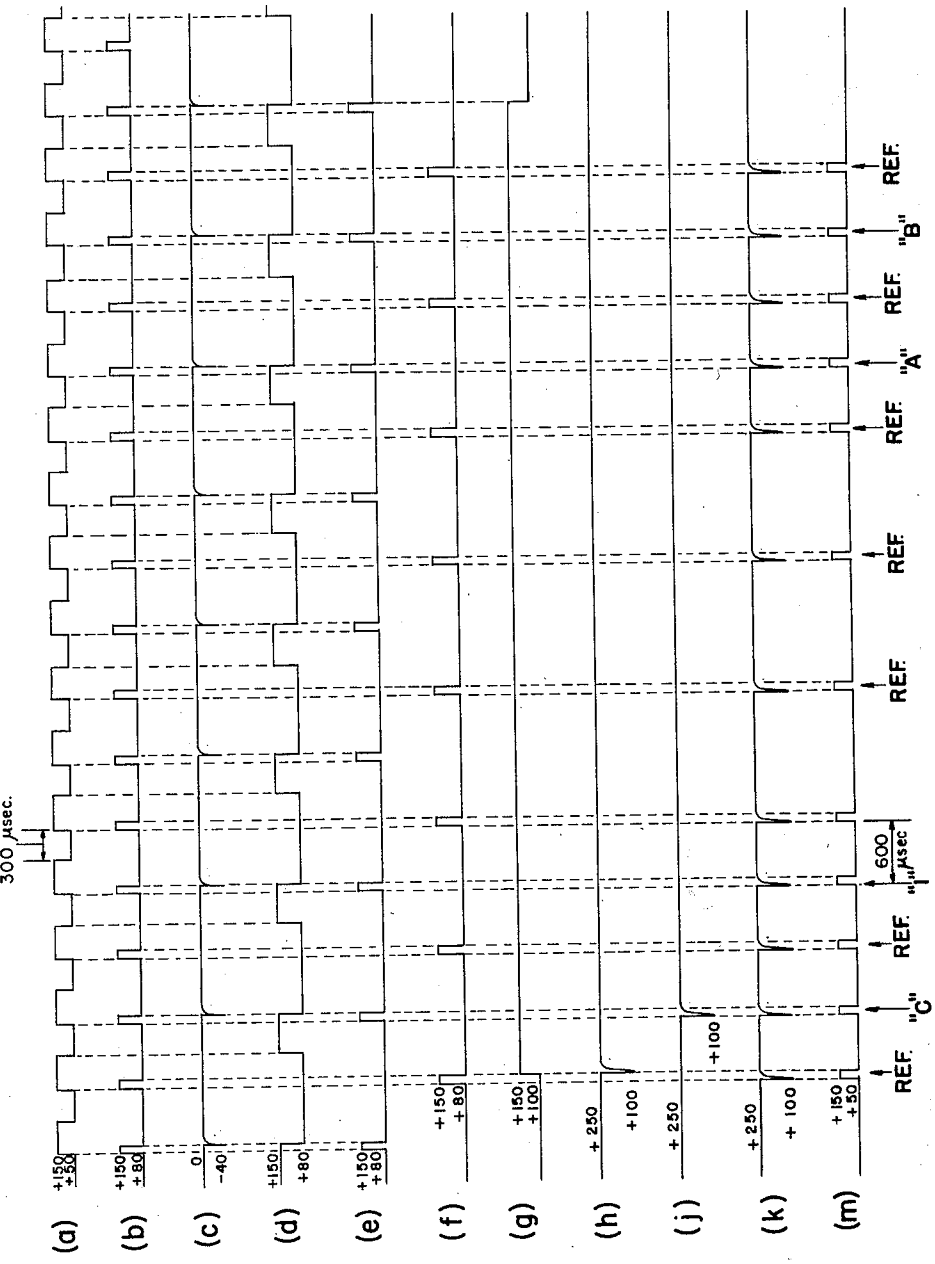
FIG 3 is a graphical representation of the wave forms occurring at various points in the system during a typical recording operation.

Another output pulse from the single-shot L, having a wave form complementary to that of FIG. 3(*d*) is carried by a line *s* to one input of an AND gate M raising its potential from 80 to 150 volts for 900 microseconds each time the generator L is fired, while a second input to this gate receives the pulses described above from the line *n*. Accordingly, this gate passes all the pulses from the single-shot H which are blocked by the gate K, as shown in FIG. 3(*f*). In addition to its normal operation resulting from the simultaneous occurrence of 150 volt signals at the two inputs mentioned above, the gate M is adapted in any well-known manner to be disabled by negative potential which may be applied to a third input through a line *t* from a binary trigger N having a normally negative output, when the record contact 21–6 is closed. Opening of the contact 21–6 or a positive voltage signal from the trigger N permits the gate M to operate in the usual manner. Inasmuch as this trigger is actuated to produce a positive output by the single-shot generator F after the tape 24 has been accelerated at the beginning of each recording and is flipped to supply negative potential by a pulse sent from the code converter through a line *u* after the number of signals comprising each code has been recorded, the gate M permits signals to pass only as long as each recording operation is in progress.

Output signals from the gate M energize the "on" input of another binary trigger P and also are carried to the code converter by a line *v* when the contact 21–8 is transferred to its normally open position to insert a reference signal between adjacent code signal positions for serial recording on the tape. These reference signals from the line *v* and the information signals generated in sequence within the code converter are received by an eight-way OR gate T and passed on to actuate a single-shot generator V which transmits pulses to the recorder C through the line *b* as shown in FIG. 2.

With the system in the recording condition, the first pulse of any series passed by the gate M turns the trigger P on and subsequent pulses in the series have no effect thereon, as illustrated in FIG. 3(*g*), the "off" input being energized by the signal from the line *u* through the normally open contact 21–9 at the end of each record. In response to this single actuation, the trigger supplies a positive pulse through a capacitor 26, the normally open contact 21–7, and the line *w* to fire a thyratron 27 shown in FIG. 2. It will be apparent that this thyratron is quenched immediately after firing by the arrangement of its plate circuit, the plate 28 being connected to a 250 volt source through a high resistance 29, for example, 390,000 ohms, and to ground through a capacitor 30 and a resistor 31 which may be 0.002 microfarad and 3,000 ohms, respectively, for example, and a conductor 32. Thus, as soon as the thyratron fires, its plate current is rapidly reduced to substantially zero and the plate voltage is maintained at a very low level by the capacitor 30 until it is extinguished. This action, illustrated by the plate voltage graph (*h*) in FIG. 3, passes a start pulse through the conductor 32 to store a start signal in a magnetic core 33 to which it is inductively linked in the usual manner. When the system is in the reproducing condition with the record relay 21 unenergized, the previously mentioned pulse sent through the line *f* is applied to the conductor *w* by the normally closed contact 21–7 to generate the start signal and each pulse passed thereafter through the gate M is transmitted by a capacitor 18′ and a diode 19' to the contact 21–7 and the *w* conductor, thus presenting a series of pulses to the grid of the thyratron 27 in accordance with the signal arrangement of the recorded code.

The core 33, which is the first of a series of seven identical cores, 33, 34, 35, 36, 37, 38 and 39, may be of any well-known type utilizing magnetic remanence to store an information pulse received through a first input and apply the stored information to an output upon receipt of a reset pulse through a second input, no signal being produced at the output when the second input is energized if information is not stored in the core. As an example, the cores may be formed of 4–79 Permalloy tape wound in toroidal form. In order to clear the cores of information stored therein, a reset conductor 40 is inductively linked to each of the cores in the series to supply restoring pulses thereto and generate output signals in accordance with any information stored therein. Positive output signals thus produced by the core 33 are carried to the grid of a thyratron 41 arranged in a manner similar to the thyratron 27 by a normally negative conductor 42, causing it to fire in the same way, as shown in FIG. 3(*j*), passing an information storage pulse to the adjacent magnetic core 34 through a conductor 43. Six other identical thyratrons 44 are each actuated by the output conductors from one of the other cores 35–39, a contact 45–1 of a read-out relay 45 being included in the plate circuit of each of these thyratrons to pass the thyratron output signal either to a cable *x* conductor, if the relay is actuated or to the next magnetic core in the series if the relay is unenergized. Thus, with the read-out relay 45 unenergized, successive reset pulses transfer a "one" information signal from the first core 33 to the last core 39 in stepwise fashion, the reset pulses being supplied from the plate circuit of a thyratron 46 in response to the positive signals from the line *r*, shown in FIG. 3(*e*), impressed on its grid electrode.

Transfer of a "one" information bit in this manner out of the last core 39 of the series supplies a thyratron pulse to a read-out trigger 47, shifting it to the "on" condition to supply positive voltage to a conventional single-shot pulse generator 48 which in turn pulses the first grid of a read-out thyratron 49 on termination of its output pulse which has a duration of approximately 900 microseconds. Another output from the trigger 47 transmits a signal through the line *h* when it is turned on to flip the trigger E, thus stopping the tape motion as described above.

Unless negative potential is applied to the second grid of the thyratron 49 through a conductor *y*, the single-shot 48 will fire the thyratron 900 microseconds after the trigger 47 is turned on, actuating the read-out relay 45 which is interposed between the thyratron plate circuit and a positive conductor 50 leading from the typewriter A and a decode matrix W through the *x* cable. In order to prevent the read-out thyratron 49 from firing during the recording operation, the line *y* is held negative through the normally open contact 21–10 as long as the record relay 21 is actuated. In addition, when this relay is restored, the binary trigger P supplies negative voltage to this line through the normally closed 21–10 contact whenever it is in the "on" condition. Thus, the read-out operation is blocked whenever an odd number of pulses have passed through the gate M, the trigger P being flipped by each positive pulse therefrom when the contact 21–8 is in its normally closed position. Therefore, inasmuch as an even number of "ones" occurs in every code group by reason of the seventh channel check signal, any failure of the system to reproduce the code properly, resulting in an odd number of "ones," will prevent the parallel code signals from being read out of the code converter B and passed to the decode matrix W and the typewriter A.

Meanwhile, the positive voltage from the trigger 47 to the first thyratron grid energizes one input of an AND gate 51, thereby causing an output pulse on the line *u* when the next *r* line signal activates the second input to that gate. As described above, this pulse flips the binary trigger N, disabling the AND gate M to prevent further pulses from being applied to the code converter B during the recording operation and also turns off the trigger P. Actuation of the relay 45 takes place a short time after its energization, permitting the succeeding reset pulse to transfer the first information signal to the last core 39 of the series, the check signal which was received first being stepped out of the series at the same time. When the relay 45 contacts transfer thereafter, a circuit is completed through a second read-out relay 52 by the contact 45–2 and closing of the contact 52–1 fires the reset thyratron 46 from the positive conductor 50. With the contacts 45–1 transferred, the output signal from each thyratron 44 having a "one" stored in the corresponding core is passed through a conductor of the *x* cable to the decode matrix W wherein selected relays of a conventional "Christmas tree" arrangement, for example, supply an actuation signal in accordance with the code to the appropriate typewriter element through a cable *z*. Completion of the typing operation deenergizes the positive line 50 to restore the decode matrix relays and the relays 45 and 52 in the code converter, resetting the thyratron 49 at the same time. Meanwhile, the trigger 47 is turned off through a capacitor 53 by deenergization of the positive conductor.

In operation, closing of the record switch 20 transfers record relay contacts to connect the line *b* and the transducer windings 22 and 23 for recording as described above. Actuation of the multivibrator G through the contact 21–5 pulses the single-shot H through the contact 21–4 and the binary trigger N is connected to disable the gate M by the contact 21–6. Also, the gate M output is connected solely to the "on" input of the trigger P, the "off" input being linked to the line *u* by the contact 21–9 and the positive output therefrom passes through the contact 21–7 and the line *w* to the thyratron 27 grid, the contact 21–10 providing negative bias to the second grid of the thyratron 49. Manipulation of the typewriter A flips the triggers D and E to start the recorder as described above and applies parallel code bits to the code converter by energizing selected relays therein. Actuation of the single-shot F by the line *g* starting signal to the recorder flips the trigger N after a suitable interval permitting acceleration of the tape, to remove the disabling voltage from the gate M. Alternate signals from the multivibrator are passed by the gate M under the influence of the single-shot L as previously described, generating the output wave form shown in FIG. 3(*f*), and first output pulse therefrom turns on the trigger P, as shown in FIG. 3(*g*), causing a pulse to pass through the capacitor 26, contact 21–7 and the line *w*, and fire the thyratron 27, storing a starting signal in the core 33. At the same time, the first and subsequent pulses from the gate M are carried through the normally open contact 21–8 and the line *v* to supply reference pulses to the eight-way OR gate T, as shown by the OR gate output wave form in the graph of FIG. 3(*k*). Output signals from the OR gate are transmitted to the single-shot V generating a sequence of reference and information pulses to be sent through the line *b* for recording as shown in FIG. 3(*m*).

As described above, alternate pulses from the single-shot H pass through the gate K to the line *r* producing the signals shown in FIG. 3(*e*) and the first pulse occurring in this series after the thyratron 27 is actuated resets the core 33, firing its thyratron 41, in the manner shown in FIG. 3(*j*) to transfer the "one" to the core 34. Every 1,200 microseconds thereafter, on receipt of a reset pulse, this signal is stepped to the next core in the series until it is transferred out of the core 39, flipping the trigger 47.

Meanwhile, assuming the character A, represented by "ones" in the "B," "A," "1" and "C" channels, has been entered into the typewriter, the normally open, now closed, contacts 11–1, 12–1, 16–1, 17–1 permit the corresponding thyratron pulses from the cores 33, 34, 38 and 39 to enter the OR gate in sequence and actuate the single-shot V as shown in FIGS. 3(*k*) and 3(*m*) to transmit information signals through the line *b* for recording. Inasmuch as the 13–1, 14–1, and 15–1 contacts remain open as the result of the "zeros" in those channels, resetting of the cores 35, 36 and 37 has no effect on the single-shot V and no signal is recorded at the corresponding positions in the series. Thus, as illustrated schematically in FIG. 4, eight reference pulses are recorded on a portion of tape 24 and information "ones" are stored at selected positions between them according to the particular code, "zeros" being represented by the absence of magnetization at information positions on the tape.

When the trigger 47 has been turned on by resetting of the last core 39, the *h* conductor turns off the trigger E, stopping the tape motion, and one input to the AND gate 51 is energized. The next reset pulse from the line *r* energizes the second input of this gate, producing an output pulse on the line *u* which resets the trigger P, as shown in FIG. 3(*g*), and also flips the trigger N disabling the gate M so that no more signals can be sent through the lines *w* and *v*. Inasmuch as a negative potential is maintained on the line *y* by the contact 21–10, the thyratron 49 does not fire when a positive pulse is received from the single-shot 48 900 microseconds after its actuation. In the meantime, the typewriter A has been unlocked, by actuation of an internal slow-operating restore magnet energized by the first operation for example, and the system is in readiness for recording of the next operation, the positive line 50 being momentarily deenergized by the restore operation to flip the trigger 47 to the "off" condition as described above.

Opening of the switch 20 restores the relay 21 and places the system in condition to reproduce information recorded on the tape 24 by connecting the transducer windings 22 and 23 to the read amplifier R. Reading of the tape information is initiated by depression of the feed switch 10 to turn off the trigger D, causing a start signal to be transmitted through the capacitor 18 and diode 19, normally closed contact 21–7, and the *w* conductor to fire the thyratron 27, storing a "one" in the core 33, as illustrated at the top line of the chart of FIG. 5. At the same time, the tape motion is started by the flipping of the trigger E, driving the magnetized areas illustrated schematically in FIG. 4 past the transducer windings 22 and 23 in the direction of the arrow. Signals detected thereby are amplified by the read amplifier R to produce the wave forms shown in FIG. 6(*a*) and the first increase in potential in each of these signals fires the single-shot H as shown in FIG. 6(*b*). As in the recording operation, the single-shot L generates blocking pulses, shown in FIG. 6(*d*), to prevent operation of the AND gate K for 900 microseconds after each signal passed by it. Accordingly, inasmuch as the first recorded signal is a reference pulse and the subsequent reference pulses are spaced at 1,200 microsecond intervals while the information signals, if any, occur 600 microseconds after each reference pulse, only the reference pulses are passed by the gate K, as illustrated by FIG. 6(*e*), and each of these energizes the reset thyratron 46 through the line *r* in the manner illustrated in FIG. 6(*m*). Meanwhile, information signals spaced between the reference signals are passed in sequence by the gate M through the 21–7 contact and the line *w* to actuate the thyratron 27 and store "ones" in the core 33 during the intervals between reference pulses and are stepped along by the reset pulses, the starting pulse previously stored preceding these signals through the core array.

Figures 4, 5:
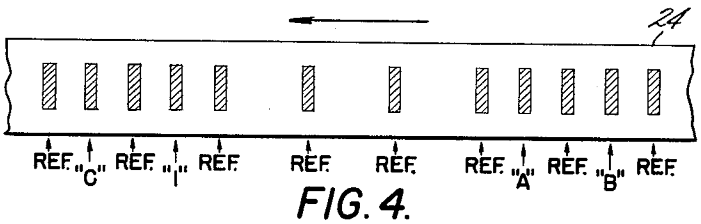
FIG. 4 illustrates a portion of magnetic tape having information recorded thereon in serial form in accordance with the invention.
FIG. 5 is a sequence chart showing the actuation of the storage units of the code converter when a serial code group is reproduced in parallel form.

Accordingly, when the character "A" is reproduced from the tape 24 as illustrated in FIGS. 5 and 6, the gate M passes information pulses according to the pattern shown in FIG. 6(*f*), actuating the thyratron 27 as shown in FIG. 6(*h*) and flipping the trigger P in the manner represented by the graph of FIG. 6(*g*). The first pulse read from the tape, being a reference signal, transfers the "one" previously stored in the core 33 by the starting pulse to the adjacent core 34 by actuation of the thyratron 46 as shown in the second line of FIG. 5, firing of the thyratron 41 being illustrated by the graph of FIG. 6(*j*). In response to the first information pulse from the gate M 600 microseconds later, representing the "C" check code bit, the trigger P is flipped and a "one" is stored in the core 33, the next reference pulse, represented as 2R in FIG. 5, transferring the stored signals to the cores 34 and 35 in response to the thyratron pulses shown in FIGS. 6(*j*) and 6(*k*), respectively. The second code signal from the tape at the "1" position is passed by the gate M and entered in the core 33 in a similar manner, at the same time restoring the trigger P to the "off" condition. Inasmuch as a "zero," indicated by the absence of a code signal, occurs between the third and fourth reference signals on the tape, the three signals stored in the cores are transferred one position by the fourth reference signal (4R) without entry of another pulse in the core 33. Subsequent pulses in the code group, reproduced serially from the tape, are applied to the converter B in the same manner, information pulses being received by the thyratron 27 to store "ones" in the magnetic cores and reference pulses firing the reset thyratron 46 to transfer core signals in the manner shown in FIG. 5.

Receipt of the seventh reference pulse by the reset thyratron 46 transfers the starting signal pulse from the last core 39 to the trigger 47, turning it on as described above. Energization of the *h* line from this trigger flips the trigger E to stop the tape as described above, but the tape continues moving until the remaining two recorded signals have been detected and applied to the code converter. As illustrated in FIG. 6(*g*), the "B" information signal, being a "one," restores the trigger P to the "off" condition to supply positive voltage to the second grid of the thyratron 49 through the line *y*. Therefore, when the single-shot 48 applies a positive pulse to the first grid of the thyratron 49 900 microseconds after the trigger 47 goes on, the thyratron fires, actuating the read-out relay 45. Meanwhile, the "B" information signal has been entered into the core 33 and the last reference pulse has fired the thyratron 46 stepping all the information "ones" stored therein one more position, thus energizing the cores 34, 38 and 39. Inasmuch as the "C" check signal has performed its function by assuring a positive input to the second grid of the thyratron 49 at the read-out time, it is transferred out of the core 39 by this last reset signal and only the information signals in the code are sent to the decode matrix W during the read-out operation.

Actuation of the read-out relay 45, which requires a time interval considerably longer than 600 microseconds, transfers the contacts 45–1 connecting the thyratrons 44 to the conductors of the *x* cable, and closing of the contact 45–2 at the same time completes a circuit through the second read-out relay 52 to the positive conductor 50. Completion of this action provides positive voltage from the conductor 50 through the contact 52–1, firing the reset thyratron 46 to reset the cores 34, 38 and 39 and cause the thyratrons 44 to transmit the code signals in parallel to the decode matrix through the *x* cable. Coincidence of the positive signal from the trigger 47 and the last reference pulse on the line *r* at the AND gate 51 causes a positive signal to be transmitted through the line *u*, resetting the triggers N and P as described above.

Automatic operation of the appropriate typewriter element, in this case the "A" character key, on signal from the decode matrix W internally disconnects the line 50 from the positive voltage source, releasing the decode matrix relays and the relays 45 and 52 and restoring the thyratron 49. Also, the trigger 47 is turned off through the capacitor 53 by this action as previously mentioned. Completion of the typewriter operation energizes the conductor *c* as described above to initiate the reproduction of the next recorded code signal from the tape 24 in the same manner. Accordingly, by means of the apparatus described herein, information entered into a typewriter, for example, generating parallel code signals, may be recorded by serial code signals and reproduced in parallel form to automatically operate the typewriter.

Although the invention has been described herein with reference to a specific embodiment thereof, many modifications and variations will occur to those skilled in the art. Accordingly, the invention is not intended to be restricted in scope except as defined by the following claims.

I claim:

1. Apparatus for converting coded information interchangeably between serial and parallel form comprising a plurality of bistable magnetic remanence information storage units connected in series, each adapted to be reset and to generate an output signal in accordance with information stored therein upon receipt of a reset signal, means in each storage unit for transferring the stored information to the next storage unit in the series on receipt of a reset signal, parallel code receiving means responsive to parallel code information connected to each of the storage units to receive output signals therefrom and arranged to pass selected storage unit output signals to a serial code output circuit in accordance with the code information received, circuit means adapted to store a start signal in the first storage unit of the series at the start of each code conversion, serial code receiving means adapted to apply code information in sequence to the first storage unit, gate means transmitting a timed sequence of reset signals to all the storage units, and read-out means responsive to the transfer of the start signal out of the last storage unit for applying all the storage unit output signals to a parallel code output circuit.

2. Apparatus for converting coded information interchangeably between parallel form and a serial form having a sequence of reference signals with information signals interposed therebetween comprising a plurality of bistable magnetic remanence information storage units connected in series, each adapted to be reset and to generate an output signal in accordance with information stored therein upon receipt of a reset signal, means in each storage unit for transferring the stored information to the next storage unit in the series on receipt of a reset signal, parallel code receiving means responsive to parallel code information signals connected to each of the storage units to receive output signals therefrom and arranged to pass selected storage unit output signals to a serial code output circuit in accordance with the code information received, circuit means adapted to store a start signal in the first storage unit of the series at the start of each code conversion, serial code receiving means adapted to apply code information in sequence to the first storage unit, gate means responsive to serial code signals adapted to transmit information signals in sequence to the first storage unit and reference signals in sequence to all the storage units as reset signals, and read-out means responsive to the transfer of the start signal out of the last storage unit for applying all the storage unit output signals to a parallel code output circuit.

3. Apparatus according to claim 2 including binary trigger means responsive to serial code information signals connected to prevent the read-out means from operating if an incorrect number of information signals in any code has been received.

4. Apparatus according to claim 2 including multivibrator means actuating the gate means to transmit a timed sequence of reset signals to all the storage units and a timed sequence of reference signals alternating with the reset signals to the serial code output circuit.

5. Apparatus according to claim 4 including trigger means responsive to the transfer of the start pulse out of the last storage unit to block the passage of further reference signals by the gate means.

References Cited in the file of this patent

UNITED STATES PATENTS

| | | |
|---|---|---|
| 2,706,215 | Van Duuren | Apr. 12, 1955 |
| 2,724,739 | Harris | Nov. 22, 1955 |
| 2,932,688 | Wright et al. | Apr. 12, 1960 |
| 2,940,670 | Kilburn et al. | June 14, 1960 |